Aug. 9, 1966
H. S. SPACIL
METHOD OF FORMING A COMPOSITE MEMBER WITH A METALLIC COATING
Filed Jan. 2, 1963
3,265,521
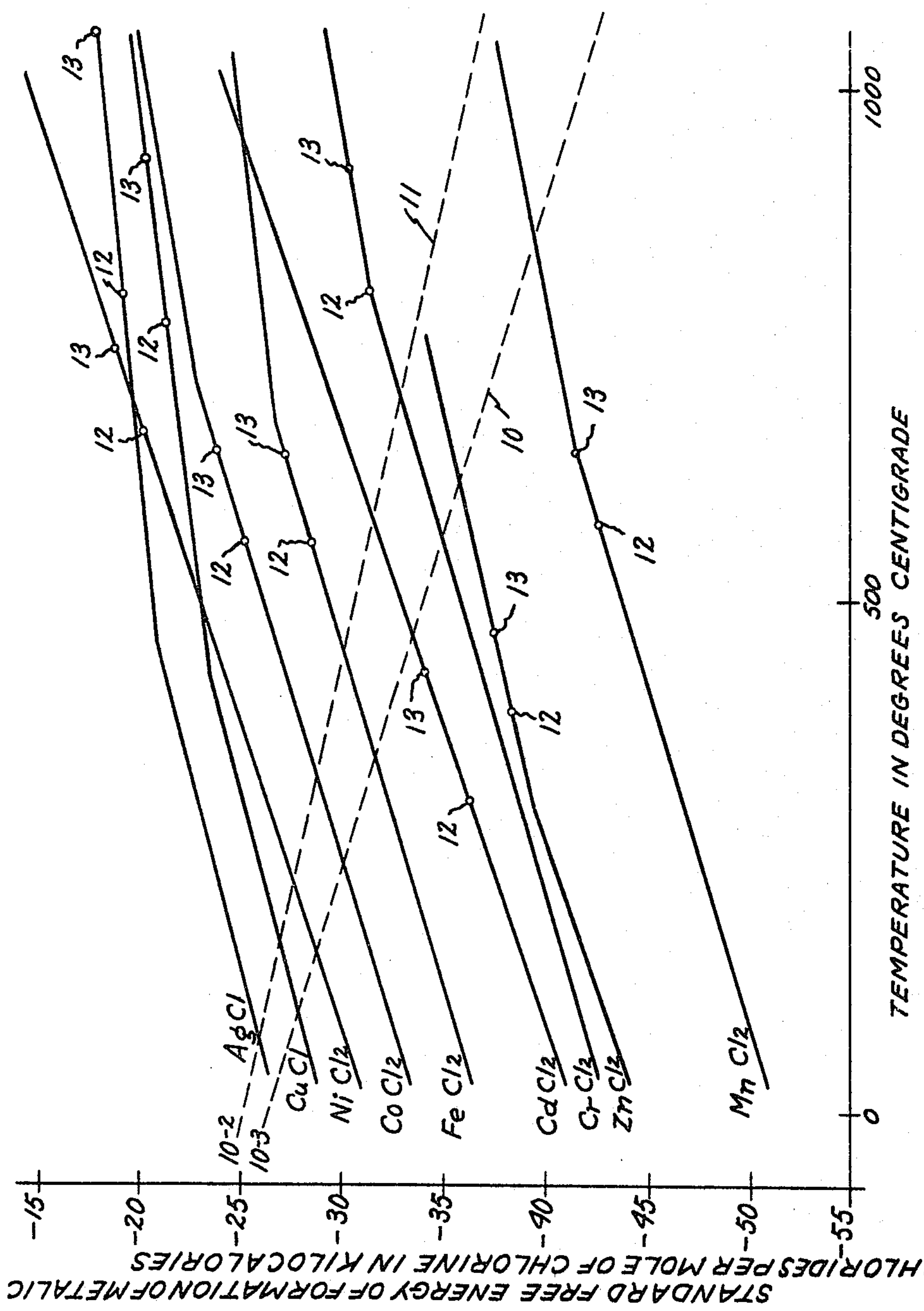
Inventor:
Henry S. Spacil,
by Paul R. Webb, II
His Attorney.

United States Patent Office 3,265,521
Patented August 9, 1966

3,265,521

METHOD OF FORMING A COMPOSITE MEMBER WITH A METALLIC COATING

Henry S. Spacil, Schenectady, N.Y., assignor to General Electric Company, a corporation of New York Filed Jan. 2, 1963, Ser. No. 249,071
8 Claims. (Cl. 117—22)

This invention relates to methods of forming composite members and more particularly to methods of forming composite members including solid or perforated metallic or non-metallic refractory substrates with a coherent metallic layer on at least one surface thereof.

It would be desirable to produce a composite member having a solid or a perforated metallic substrate with a coherent metallic layer thereon. It would also be advantageous to provide such a composite member having a solid or a perforated non-metallic refractory substrate with a coherent metallic layer thereon. A metallic substrate can be coated with a metallic layer by electrodeposition or by electrolysis. Similarly, non-metallic refractory substrates can be coated with a metallic layer by electrodeposition. However, it would be desirable to provide such substrates with uniform, coherent metallic layers in a simple but reproducible manner for employment as articles of various types including electrodes, catalysts and filters. The present invention is directed to forming such composite members.

In my copending patent application, Serial No. 249,070, filed Jan. 2, 1963, now abandoned, there is disclosed and claimed a method of forming a coherent metallic member. My copending application is assigned to the same assignee as the present application. In my above copending application, a method is disclosed and claimed for forming a coherent metallic member which comprises forming at least one metallic halide into a preshaped member, positioning the preshaped member within a chamber, introducing into the chamber a stream of gas, the essential active reducing ingredient of which is hydrogen, and heating the member to a temperature in a temperature range having a lower limit determined by the hydrogen halide partial pressure to the hydrogen partial pressure ratio in equilibrium with the metal of the member and with the member in a range from 0.001 to 0.01 and an upper limit determined by a greater loss of metal by halide evaporation than reduction to metal by hydrogen whereby said member is reduced to a coherent metallic member.

It is an object of my invention to provide a method of forming a composite member including a solid, metallic substrate with a coherent metallic layer thereon.

It is another object of my invention to provide a method of forming a composite member including a perforated metallic substrate with a coherent metallic layer thereon.

It is a further object of my invention to provide a method of forming a composite member including a solid, non-metallic refractory substrate with a coherent metallic layer thereon.

It is a still further object of my invention to provide a composite member including a perforated, non-metallic refractory substrate with a coherent metallic layer thereon.

In carrying out my invention in one form, a method of forming a composite member comprises providing a substrate, forming at least one metallic halide powder into a preshaped powder layer on at least one surface of the substrate thereby providing a coated substrate, positioning the coated substrate within a stream of gas, consisting essentially of hydrogen, and heating the coated substrate to a temperature in a temperature range having a lower limit in a range determined by the hydrogen halide partial pressure to the hydrogen partial pressure ratio in equilibrium with the metal of the metallic halide on the substrate and with the metallic halide on the substrate in a range from 0.001 to 0.01, and an upper limit in a range determined by the metallic halide vapor pressure multiplied by the number of halide atoms per metallic atom in a range from 0.001 to 0.01 whereby the layer is reduced to a coherent metallic layer on the substrate.

These and various other objects, features and advantages of the invention will be better understood from the following description taken in connection with the accompanying drawings in which:

The single figure of the drawing is a graph plotting the standard free energy of formation of metallic chlorides per mole of chlorine in kilocalories versus temperature in degrees centigrade.

The present invention is directed to methods of forming composite members including solid or perforated metallic or non-metallic refractory substrates with a coherent metallic layer thereon. The coherent metallic layer is formed on such substrates by the reduction of their respective halides under specific conditions. For example, nickel, cobalt, chromium, silver, copper and iron are produced from the respective halides. Various alloys are also formed by appropriate mixtures of the respective halides.

I found unexpectedly that a composite member could be formed from a solid or a perforated metallic or non-metallic refractory substrate with a coherent metallic layer thereon. In the formation of such a composite member, at least one metallic halide is formed into a preshaped layer on at least one surface of a substrate thereby providing a coated substrate whose layer is reduced under specific conditions to a coherent metallic layer. The information of the metallic halide into a preshaped layer is accomplished, for example, by pressing the halide. Other preshaping methods are also suitable. These conditions require that the coated substrate be positioned within a stream of gas, the essential active reducing ingredient of which is hydrogen. For example, a hydrogen furnace is employed for this purpose. It is also necessary to employ a temperature range within the furnace whereby the reduction of the halide tends to occur to a significant extent. I found further that the coated substrate must be heated to a temperature in a temperature range having a lower limit determined by the hydrogen halide partial pressure to the hydrogen partial pressure ratio in equilibrium with the metal of the metallic halide on the substrate and with the metallic halide on the substrate in a range from 0.001 to 0.01. I found also that the upper temperature limit is a range determined by the metallic halide vapor pressure multiplied by the number of halide atoms per metallic atom in a range from 0.001 to 0.01. Under these specific conditions, I discovered that a solid or a perforated metallic or non-metallic refractory substrate could have a metallic layer formed thereon to provide a composite member.

I found that various solid and perforated metallic and non-metallic refractory materials were suitable for substrates. For example, a solid or perforated substrate of silver, iron, copper, tungsten or molybdenum is suitable. It is necessary that the substrate have a sufficiently high melting point so that the particular metallic halide can be reduced thereon to its respective metal without destruction of the substrate. Various solid and perforated non-metallic refractory substrates, such as, alumina and zirconia are satisfactory.

I discovered further that a mixture of metallic halides could also be formed into a layer on such a substrate and reduced under the above conditions to provide a coherent metallic layer. For example, such a halide mixture would include the mixing of at least two metallic halide powders such as nickel chloride and chromium trichloride to provide a mixture which is subsequently formed into a layer. The resulting coherent metallic layer is a nickel-chromium alloy. The subject method is also applicable to forming at least one mixed metallic halide into a layer which is reduced subsequently under the above conditions to provide a coherent metallic layer. Such a mixed halide would include at least two metallic components in the halide, such as nickel and cobalt.

At least one metallic halide and a metal which will react with the metal reduced from the metallic halide are also formed into a layer as disclosed above and reduced to a coherent metallic layer. In the formation of such a layer, at least one metallic halide, a mixture of metallic halides or at least one mixed metallic halide is employed. The reacting metal can be a single metal, a metal mixture, or a metallic alloy, or derived from a metal compound, a metal compound mixture, or a mixed metal compound. For example, a nickel halide $NiCl_2$, and a copper halide, CuCl, comprising a mixture of metallic halides and a reacting metal zirconium in the form of zirconium hydride powder are formed together into a layer which is reduced in the manner described above. A reacting metal in the form of a mixed metallic alloy such as an iron-tungsten-carbon alloy in powder form and a mixture of metallic halides of nickel chloride, ferrous chloride, chromium chloride, and cobalt chloride, are formed together into a layer. The coherent metallic layer which is formed from the layer on the substrate is a nickel-iron-chromium-cobalt-tungsten-carbon alloy.

I found further that at least one inert metallic filler or at least one inert non-metallic filler can be combined with at least one metallic halide to form the layer on the substrate. Furthermore, I found that such a metallic or non-metallic filler could be combined with at least one metallic halide and at least one other reacting metal to form a cohorent metallic layer. For example, a metallic filler of molybdenum in powder form is mixed with a metallic halide such as a copper chloride to produce a coherent metallic layer of copper metal with molybdenum particles therein. A non-metallic filler of magnesium silicate powder is combined with a mixture of metallic halides of nickel chloride and chromium chloride to form upon subsequent reduction a nickel-chromium alloy with magnesium silicate particles therein. A non-metallic filler of titanium oxide powder is combined with a metal compound of titanium hydride and with a mixture of metallic halides of ferrous chloride, nickel chloride, and cobalt chloride to form an iron-nickel-cobalt-tintanium alloy with titanium oxide particles therein.

In the single figure of the drawing, the standard free energy of formation of metallic chlorides per mole of chlorine in kilocalories is plotted against temperature in degrees centigrade.

Broken lines 10 and 11 set forth a range for the minimum standard free energy of formation of metallic chlorides per mole of chlorine in kilocalories which is necessary for each of the metallic chlorides set forth on the graph to be reduced from a metallic chloride layer on a substrate to a coherent metallic layer on the substrate at a hydrogen pressure of one atmosphere. Broken lines 10 and 11 define a lower temperature limit established by the hydrogen chloride partial pressure to the hydrogen partial pressure ratio in equilibrium with the metal of the metallic halide on the substrate and with the metallic halide on the substrate in a range from 0.001 to 0.01. On each line identifying a particular metallic chloride, a point 12 defines the temperaure at which the vapor pressure of the metallic chloride multiplied by the number of chlorine atoms per metal atom is equal to 0.001. A point 13 on each line defines the temperature at which the vapor pressure of the metallic chloride multiplied by the number of chlorine atoms per metal atom is equal to 0.01. The metallic chlorides for the points 12 and 13 which are plotted to the right and above the lower temperature limit range are reducible to their respective coherent metals without undue loss of metal by evaporation of metallic chloride. The metallic chlorides whose points 12 and 13 are plotted to the left and below the lower temperature limit range are not reducible. Thus, it is feasible to reduce silver chloride, cuprous chloride, cobalt chloride, ferrous chloride and chromium chloride to their respective coherent metals. It is not feasible to reduce cadmium chloride, zinc chloride or manganese chloride to their respective metals. In the latter metallic chlorides, chloride evaporation occurs more rapidly than reduction of the metal by hydrogen.

While the subject graph sets forth a plurality of metallic chlorides which are suitable in the present process, similar graphs can be prepared for suitable metallic bromides and metallic iodides. When a mixture of metallic chlorides or a mixed metallic chloride which may be combined with a reacting metal, or a filler, or both, to provide a coherent metallic layer, a temperature is selected from the above graph, which temperature is within the respective temperature ranges for reduction of the individual metallic chlorides. It is preferred also to reduce the particular chloride or chlorides at a higher temperature within the temperature range to reduce the reduction time.

In accordance with the practice of the present invention, a composite member was produced from a perforated metallic substrate of nickel screen and a layer of nickel chloride powder on opposite surfaces of the screen. The powder was compacted into thin layers on these surfaces at pressures of about 1000 pounds per square inch. The coated screen or substrate was positioned within a stream of hydrogen gas and was heated to a temperature of 700° C. over a period of one hour. The heat was then discontinued and the apparatus was allowed to cool to room temperature. While hydrogen gas was employed as the reducing agent, other gas streams can be used provided the essential active reducing ingredient of such a stream is hydrogen. The coherent nickel layers had about 85 percent porosity. Such a composite body is particularly suitable as an electrode structure in an alkaline secondary cell.

An example of a method of forming a composite member in accordance with the present invention is as follows:

Nickel chloride powder was compacted into thin preshaped layers at pressures of about 1000 pounds per square inch on opposite surfaces of a perforated metallic substrate in the form of a nickel screen. This coated substrate was heated to a temperature of 700° C. over a period of one hour in a hydrogen atmosphere which was introduced at a pressure of one atmosphere. The heat was then discontinued and the apparatus was allowed to cool to room temperature. A composite member having a perforated nickel substrate with a coherent nickel layer thereon was produced by this method. The nickel layer had 85 percent porosity.

While other modifications of this invention and variations of method which may be employed within the scope of the invention have not been described, the invention is intended to include such that may be embraced within the following claims.

What I claim as new and desire to secure by Letters Patent of the United States is:

1. A method of forming a composite member which comprises providing a substrate, forming at least one metallic halide powder into a preshaped powder layer on at least one surface of said substrate thereby providing a coated substrate, positioning said coated substrate within a stream of gas consisting essentially of hydrogen, and heating said coated substrate to a temperature in a temperature range having a lower limit in a range determined by the hydrogen halide partial pressure to the hydrogen partial pressure ratio in equilibrium with the metal of said metallic halide on said substrate and with said metallic halide on said substrate in a range from 0.001 to 0.01, and an upper limit in a range determined by the metallic halide vapor pressure multiplied by the number of halide atoms per metallic atom in a range from 0.001 to 0.01 whereby said layer is reduced to a coherent metallic layer on said substrate.

2. A method of forming a composite member which comprises providing a substrate, forming a mixture of metallic halide powders into a preshaped powder layer on at least one surface of said substrate thereby providing a coated substrate, positioning said coated substrate within a stream of gas consisting essentially of hydrogen, and heating said coated substrate to a temperature in a temperature range having a lower limit in a range determined by the hydrogen halide partial pressure to the hydrogen partial pressure ratio in equilibrium with the metal of said metallic halide on said substrate and with said metallic halide on said substrate in a range from 0.001 to 0.01, and an upper limit in a range determined by the metallic halide vapor pressure multiplied by the number of halide atoms per metallic atom in a range from 0.001 to 0.01 whereby said layer is reduced to a coherent metallic layer on said substrate.

3. A method of forming a composite member which comprises providing a substrate, forming at least one mixed metallic halide powder into a preshaped powder layer on at least one surface of said substrate thereby providing a coated substrate, positioning said coated substrate within a stream of gas consisting essentially of hydrogen, and heating said coated substrate to a temperature in a temperature range having a lower limit in a range determined by the hydrogen halide partial pressure to the hydrogen partial pressure ratio in equilibrium with the metal of said metallic halide on said substrate and with said metallic halide on said substrate in a range from 0.001 to 0.01, and an upper limit in a range determined by the metallic halide vapor pressure multiplied by the number of halide atoms per metallic atom in the range from 0.001 to 0.01 whereby said layer is reduced to a coherent metallic layer on said substrate.

4. A method of forming a composite member which comprises providing a substrate, forming at least one metallic halide powder and at least one powder containing a metal adapted to form an intermetallic compound with the metal reduced from the metallic halide into a preshaped powder layer on at least one surface of said substrate, positioning said coated substrate within a stream of gas, consisting essentially of hydrogen, and heating said coated substrate to a temperature in a temperature range having a lower limit in a range determined by the hydrogen halide partial pressure to the hydrogen partial pressure ratio in equilibrium with the metal of said metallic halide on said substrate and with said metallic halide on said substrate in a range from 0.001 to 0.01, and an upper limit in a range determined by the metallic halide vapor pressure multiplied by the number of halide atoms per metallic atom in a range from 0.001 to 0.01 whereby said layer is reduced to a coherent metallic layer on said substrate.

5. A method of forming a composite member which comprises providing a substrate, forming at least one metallic halide powder and at least one inert metallic filler into a preshaped powder layer on at least one surface of said substrate thereby providing a coated substrate, positioning said coated substrate within a stream of gas consisting essentially of hydrogen, and heating said coated substrate to a temperature in a temperature range having a lower limit in a range determined by the hydrogen halide partial pressure to the hydrogen partial pressure ratio in equilibrium with the metal of said metallic halide on said substrate and with said metallic halide on said substrate in a range from 0.001 to 0.01, and an upper limit in a range determined by the metallic halide vapor pressure multiplied by the number of halide atoms per metallic atom in a range of from 0.001 to 0.01 whereby said layer is reduced to a coherent metallic layer on said substrate.

6. A method of forming a composite member which comprises providing a substrate, forming at least one metallic halide powder and at least one inert non-metallic filler into a preshaped powder layer on at least one surface of said substrate thereby providing a coated substrate, positioning said coated substrate within a stream of gas consisting essentially of hydrogen, and heating said coated substrate to a temperature in a temperature range having a lower limit in a range determined by the hydrogen halide partial pressure to the hydrogen partial pressure ratio in equilibrium with the metal of said metallic halide on said substrate and with said metallic halide on said substrate in a range from 0.001 to 0.01, and an upper limit in a range determined by the metallic halide vapor pressure multiplied by the number of halide atoms per metallic atom in a range from 0.001 to 0.01 whereby said layer is reduced to a coherent metallic layer on said substrate.

7. A method of forming a composite member which comprises providing a substrate, forming at least one metallic halide powder, at least one metal powder adapted to react with the metal of the metallic halide, and at least one inert metallic filler into a preshaped powder layer on at least one surface of said substrate thereby providing a coated substrate, positioning said coated substrate within a stream of gas consisting essentially of hydrogen, and heating said coated substrate to a temperature in a temperature range having a lower limit in a range determined by the hydrogen halide partial pressure to the hydrogen partial pressure ratio in equilibrium with the metal of said metallic halide on said substrate and with said metallic halide on said substrate in a range from 0.001 to 0.01, and an upper limit in a range determined by the metallic halide vapor pressure multiplied by the number of halide atoms per metallic atom in a range from 0.001 to 0.01 whereby said layer is reduced to a coherent metallic layer on said substrate.

8. A method of forming a composite member which comprises providing a substrate, forming at least one metallic halide powder, at least one metal powder adapted to react with the metal of the metallic halide, and at least one inert non-metallic filler into a preshaped powder layer on at least one surface of said substrate thereby providing a coated substrate, positioning said coated substrate within a stream of gas consisting essentially of hydrogen, and heating said coated substrate to a temperature in a temperature range having a lower limit in a range determined by the hydrogen halide partial pressure to the hydrogen partial pressure ratio in equilibrium with the metal of said metallic halide on said substrate and with said metallic halide on said substrate in a range from 0.001 to 0.01, and an upper limit in a range determined by the metallic halide vapor pressure multiplied by the number of halide atoms per metallic atom in a range from 0.001 to 0.01 whereby said layer is reduced to a coherent metallic layer on said substrate.

(References on following page)

References Cited by the Examiner

UNITED STATES PATENTS

| | | | |
|---|---|---|---|
| 2,257,668 | 9/1941 | Becker et al. | 117—107.2 |
| 2,418,148 | 4/1947 | Williams et al. | |
| 2,663,633 | 12/1953 | Crowley | 75—34 |
| 2,664,352 | 12/1953 | Darner | 75—34 |
| 2,792,657 | 5/1957 | Slowter | 117—107.2 |
| 2,815,299 | 12/1957 | Raymond | 117—107.2 |
| 3,072,983 | 1/1963 | Brenner et al. | 117—107.2 |

FOREIGN PATENTS

| | | |
|---|---|---|
| 541,859 | 6/1957 | Canada. |
| 644,813 | 10/1950 | Great Britain. |
| 668,544 | 3/1952 | Great Britain. |

ALFRED L. LEAVITT, *Primary Examiner.*

RICHARD D. NEVIUS, *Examiner.*

A. H. ROSENSTEIN, *Assistant Examiner.*